(12) United States Patent
Shmuel et al.

(10) Patent No.: US 12,374,803 B2
(45) Date of Patent: Jul. 29, 2025

(54) DETECTION OF WEAK SIGNALS OF UNKNOWN PARAMETERS

(71) Applicant: ELTA SYSTEMS LTD., Ashdod (IL)

(72) Inventors: Amir Shmuel, Nofit (IL); Maxim Suhanov, Yavne (IL)

(73) Assignee: ELTA SYSTEMS LTD., Ashdod (IL)

( * ) Notice: Subject to any disclaimer, the term of this patent is extended or adjusted under 35 U.S.C. 154(b) by 323 days.

(21) Appl. No.: 17/760,052

(22) PCT Filed: Feb. 1, 2021

(86) PCT No.: PCT/IL2021/050115
§ 371 (c)(1),
(2) Date: Aug. 3, 2022

(87) PCT Pub. No.: WO2021/156855
PCT Pub. Date: Aug. 12, 2021

(65) Prior Publication Data
US 2023/0057530 A1    Feb. 23, 2023

(30) Foreign Application Priority Data

Feb. 3, 2020 (IL) .......................................... 272439

(51) Int. Cl.
*H01Q 15/08* (2006.01)
*H01Q 5/28* (2015.01)
(Continued)

(52) U.S. Cl.
CPC ............... *H01Q 15/08* (2013.01); *H01Q 5/28* (2015.01); *H01Q 13/02* (2013.01); *H01Q 19/062* (2013.01)

(58) Field of Classification Search
CPC .......... H01Q 15/08; H01Q 5/28; H01Q 13/02; H01Q 19/062; H01Q 1/523; H01Q 3/14;
(Continued)

(56) References Cited

U.S. PATENT DOCUMENTS 5,583,505 A    12/1996  Andersen et al.
7,782,247 B1 *  8/2010  VanLaningham ..... G01S 13/003
                                                          342/146
(Continued)

FOREIGN PATENT DOCUMENTS

EP    1 109 252 A2    6/2001
JP    2005-61905 A    3/2005

OTHER PUBLICATIONS

M. Mangel, "Three Bearing Method for Passive Triangulation in Systems with Unknown Deterministic Biases," in IEEE Transactions on Aerospace and Electronic Systems, vol. AES-17, No. 6, pp. 814-819, Nov. 1981, doi: 10.1109/TAES.1981.309133. (Year: 1981)*

(Continued)

*Primary Examiner* — Vladimir Magloire
*Assistant Examiner* — Remash R Guyah
(74) *Attorney, Agent, or Firm* — FISHERBROYLES, LLP; Roger L. Browdy; Ronni S. Jillions

(57) ABSTRACT

An antenna system for at least one of Elint and Sigint, configured to detect weak electro-magnetic signals, comprises an antenna and a feed manifold, which comprises a plurality of feeds located on a focal surface of the antenna. The antenna is configured to function as a two-dimensional focusing element, having spherical symmetry. The system is configured such that a planar wave-front associated with a electro-magnetic signal, that is impinging on the antenna, is focused by the antenna to a feed, situated at a distance from the antenna corresponding to a focal distance of the antenna along a propagation vector of the wave-front. The spatial field of view of the antenna system is based on a number of feeds and the spacing between feeds. This produces, for each feed, a respective high-gain beam, with direction along the line connecting the center of the spherical symmetry and the feed.

23 Claims, 8 Drawing Sheets

(51) Int. Cl.
  *H01Q 13/02* (2006.01)
  *H01Q 19/06* (2006.01)
  *H01Q 13/06* (2006.01)
  *H01Q 13/08* (2006.01)
  *H01Q 13/10* (2006.01)
  *H01Q 13/20* (2006.01)
  *H01Q 15/10* (2006.01)
  *H01Q 15/14* (2006.01)
  *H01Q 15/16* (2006.01)
  *H01Q 19/08* (2006.01)
  *H01Q 19/09* (2006.01)
  *H01Q 19/10* (2006.01)
  *H01Q 25/00* (2006.01)

(58) Field of Classification Search
  CPC .... H01Q 3/245; H01Q 3/2605; H01Q 25/007; H01Q 3/46; H01Q 1/288; H01Q 3/30; H01Q 21/0025; H01Q 21/061; H01Q 21/22; H01Q 1/241; H01Q 21/0031; H01Q 1/246; H01Q 1/526; H01Q 5/30; H01Q 25/008; H01Q 1/282; H01Q 15/23; H01Q 3/08; H01Q 1/1264; H01Q 3/18; H01Q 19/104; H01Q 21/00; H01Q 15/10; H01Q 15/14; H01Q 15/16; H01Q 19/06–10; H01Q 19/13; H01Q 13/06; H01Q 13/08; H01Q 13/10; H01Q 13/20; H01Q 25/00–02; G01S 7/021; G01S 2013/029; G01S 19/13; G01S 19/24; G01S 19/34; G01S 19/37; G01S 19/36; G01S 19/29; H04B 7/0617; H04B 1/707; H04B 2201/70715; H04B 1/7085; H04B 1/70775

USPC ....... 342/52, 357.72, 407, 13; 343/778, 776, 343/786, 853, 705, 754, 911, 753; 370/318
  See application file for complete search history.

(56) References Cited

U.S. PATENT DOCUMENTS

2003/0006941 A1*  1/2003  Ebling .................. H01Q 25/008
                                                      343/911 L
  2003/0151553 A1   8/2003  Ylitalo
  2005/0212711 A1   9/2005  Ogawa et al.
  2007/0216596 A1*  9/2007  Lewis .................. H01Q 25/008
                                                      343/848
  2007/0296640 A1* 12/2007  Colburn ............... H01Q 19/062
                                                      343/783
  2009/0010239 A1   1/2009  Yeh et al.
  2009/0278733 A1* 11/2009  Haworth .................. G01S 5/06
                                                      342/357.4
  2012/0313817 A1  12/2012  Underbrink et al.
  2016/0104941 A1*  4/2016  Lee ........................ H01Q 1/523
                                                      343/702
  2016/0146923 A1*  5/2016  McCorkle ................ H01Q 9/28
                                                      342/442
  2016/0187451 A1*  6/2016  Meiman .................... G01S 3/46
                                                      342/442
  2017/0324171 A1  11/2017  Shehan
  2019/0074588 A1   3/2019  Scarborough et al.

OTHER PUBLICATIONS

F. Fois, C. Stolk and R. van der Heiden, "Direction Finding and Signal Characterization of Unknown Emitters," 2019 20th International Radar Symposium (IRS), Ulm, Germany, 2019, pp. 1-10, doi: 10.23919/IRS.2019.8768164. (Year: 2019)*

* cited by examiner

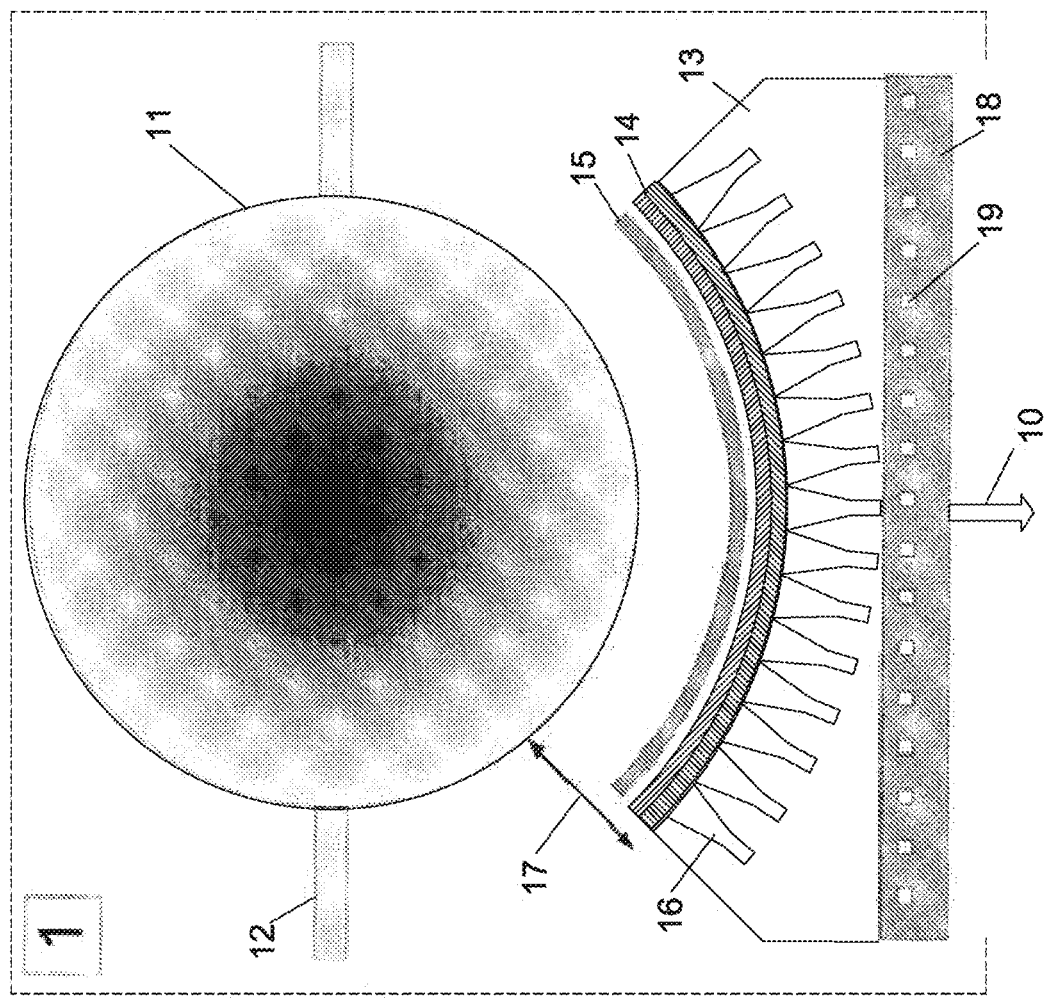

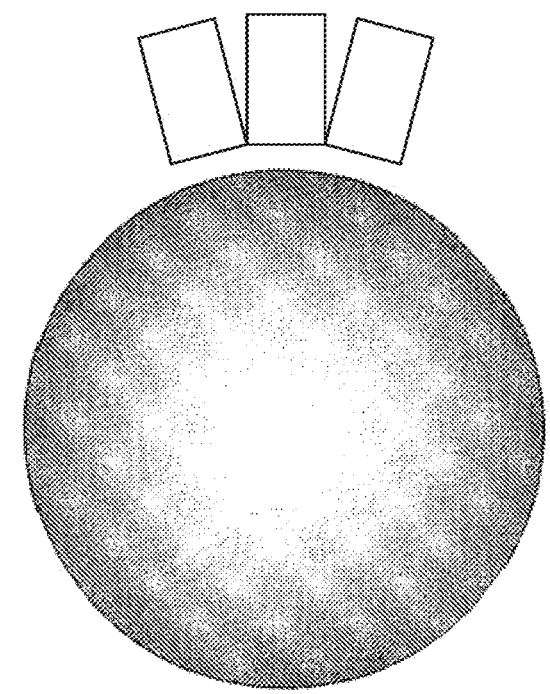
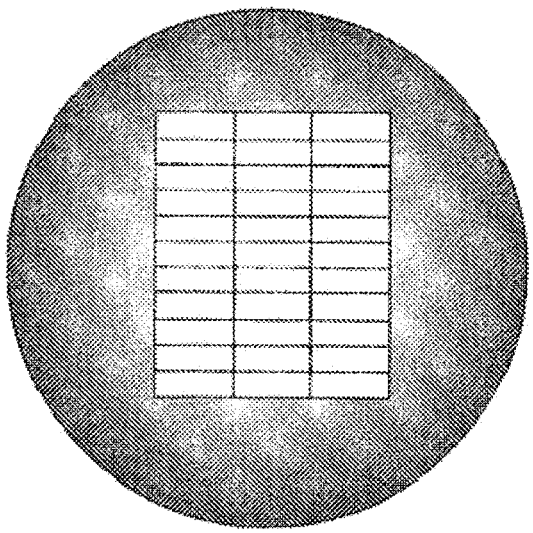
Fig. 6

DETECTION OF WEAK SIGNALS OF UNKNOWN PARAMETERS

FIELD OF THE INVENTION

This invention relates to electro-magnetic signal detection.

BACKGROUND

Vehicles (e.g. aircraft), such as stealth airplanes, with reduced radar cross section (RCS) signature, are known in the art.

GENERAL DESCRIPTION

In accordance with a first aspect of the presently disclosed subject matter, there is presented an antenna system, configured to detect weak electro-magnetic signals, comprising:
  a. an antenna; and
  b. a feed manifold, the feed manifold comprising a plurality of feeds located on a focal surface of the antenna,
wherein the antenna is configured to function as a two-dimensional focusing element, having spherical symmetry, wherein the antenna system is configured such that a planar wave-front impinging on the antenna, the planar wave-front associated with the least one electro-magnetic signal, is focused by the antenna to a feed of the plurality of feeds, the feed situated at a distance from the antenna corresponding to a focal distance of the antenna along a propagation vector of the planar wave-front,
wherein the spatial field of view of the antenna system is based on a number of the plurality of feeds and the spacing between feeds of the plurality of feeds, the antenna thereby producing, for each feed of the plurality of feeds, a respective high-gain beam, wherein the direction of the respective high-gain beam is along the line connecting the center of the spherical symmetry and the each feed.

In addition to the above features, the system according to this aspect of the presently disclosed subject matter can include one or more features (i) to (xxii) listed below, in any desired combination or permutation which is technically possible:
  (i) the antenna is one of a lens antenna and a shaped reflector.
  (ii) the lens antenna is spherical.
  (iii) the lens antenna is a spherical constant-K dielectric antenna.
  (iv) the lens antenna is a Luneburg lens antenna.
  (v) the lens antenna is a hemispherical antenna.
  (vi) the shaped reflector is a circular reflector.
  (vii) the feed manifold is a sectoral feed manifold.
  (viii) the spacing between the feeds is equal to or less than half of a wavelength of the at least one electro-magnetic signal.
  (ix) the distance from the antenna differs from the focal distance, thereby decreasing a focus of the feed, thereby widening a received beam width of the respective high-gain beam, thereby reducing a sensitivity of the cross-over loss of the respective high-gain beam to the spacing between feeds.
  (x) the each feed comprises an RF choke, thereby enabling reduction of electro-magnetic coupling between adjacent feeds.
  (xi) the feed manifold is a multi-dimensional feed manifold.
  (xii) the feed manifold is configured for mechanical rotation, thereby enabling change of a center of the spatial field of view.
  (xiii) the spatial field of view comprises a 90 degree field of view.
  (xiv) the spatial field of view comprises a 120 degree field of view.
  (xv) the each feed comprises a waveguide horn.
  (xvi) the waveguide horn is a horizontally-polarized waveguide horn.
  (xvii) the system comprises a sectoral polarizer.
  (xviii) the system comprises a sectoral radome.
  (xix) the system comprises a front-end circuit.
  (xx) the feed manifold comprises two opposite halves.
  (xxi) the antenna system further comprises a first processing circuitry, the first processing circuitry configured to perform weighted summing of adjacent respective high-gain beams, thereby enabling production of intermediate virtual high gain beams.
  (xxii) the antenna system comprises a second processing circuitry, the second processing circuitry configured to perform direction finding of the at least one electro-magnetic signal by amplitude comparison of adjacent high-gain beams.

In accordance with a second aspect of the presently disclosed subject matter, there is presented a system for processing of electro-magnetic signals, comprising a third processing circuitry, the third processing circuitry configured to perform a computerized method, the computerized method comprising the following:
  a. receive at least one sampled received signal, comprising at least one emitted signal emitted by a transmitter;
  b. determine at least one point in a parameter space, wherein the at least one point in the parameter space comprises: at least one value of pulse width, at least one value of Pulse Repetition Interval (PRI), at least one value of initial time, and at least one value of number of pulses integrated, wherein the number of integrated pulses is at least two;
  c. perform an integration associated with the sampled received signal, based on the at least one at least one point in the parameter space, thereby deriving at least one integrated power correlating the at least one sampled received signal with the at least one point;
  d. determine a derived integrated power of the at least one integrated power which meets a signal-to-noise (SNR) condition, the derived integrated power constituting a chosen integrated power;
  e. determine a point of the at least one point in the parameter space that correlates with the chosen integrated power; and
  f. determine that parameters corresponding to the determined point constitute parameters of the at least one emitted signal, thereby detecting the at least one emitted signal.

In addition to the above features, the system according to this aspect of the presently disclosed subject matter can include one or more features (xxiii) to (xxxii) listed below, in any desired combination or permutation which is technically possible:
  (xxiii) said step (c) being performed for first increasing values of number of pulses, until the derived integrated power meets a first SNR threshold condition.
  (xxiv) the method further comprising performing said step (c) for second increasing higher values of the number pulses, for a first modified parameter space comprising a subset of at the least one value of pulse width, the at least one value of PRI, and the at least one value of initial time, wherein the first modified parameter space being based on the performance of said step (c) for the first increasing higher values, wherein the second increasing higher values being larger than the first increasing higher values.

(xxv) the SNR condition comprises a SNR of the chosen integrated power being above a required SNR.

(xxvi) the chosen integrated power being a maximum derived integrated power, corresponding to a maximum SNR.

(xxvii) the integration comprises summation of energy of the at least one the sampled received signal.

(xxviii) the least one emitted signal comprises a modulated signal.

(xxix) the least one emitted signal comprises a non-coherent signal.

(xxx) the least one emitted signal comprises a coherent signal, wherein the integration compromising signal voltage integration of the sampled received signal, thereby enabling an improvement in SNR of the detected emitted as compared to a non-coherent integration.

(xxxi) the improved SNR is proportional to the number of integrated pulses.

(xxxii) said step (c) is performed utilizing a non-coherent integration, until the derived integrated power meets a second SNR threshold condition, the method further comprising performing said step (c) for a second modified parameter space comprising a subset of at least one value of pulse width, the at least one value of PRI, and the at least one value of initial time, wherein the second modified parameter space being based on the non-coherent integration.

In accordance with a third aspect of the presently disclosed subject matter, there is presented antenna system, configured to detect weak electro-magnetic signals, comprising:
  a. an antenna;
  b. a feed manifold, the feed manifold comprising a plurality of feeds located on a focal surface of the antenna; and
  c. a third processing circuitry, the third processing circuitry configured to perform a computerized method,
  wherein the antenna is configured to function as a two-dimensional focusing element, having spherical symmetry,
  wherein the antenna system configured such that a planar wave-front impinging on the antenna, the planar wave-front associated with the least one electro-magnetic signal, is focused by the antenna to a feed of the plurality of feeds, the feed situated at a distance from the antenna corresponding to a focal distance of
  the antenna along a propagation vector of the planar wave-front,
  wherein the spatial field of view of the antenna system is based on a number of
  the plurality of feeds and the spacing between feeds of the plurality of feeds, the antenna thereby producing, plurality of high-gain beams, each respective high-gain beam of the plurality of high-gain beams associated with each feed of the plurality of feeds, wherein the direction of the each respective high-gain beam is along the line connecting the center of the spherical symmetry and the each feed, wherein a plurality of the respective high-gain beams constituting at least one sampled received signal, wherein the computerized method comprising the following:
  g. receive at least one sampled received signal, comprising at least one emitted signal emitted by a transmitter;
  h. determine at least one point in a parameter space, wherein the at least one point in the parameter space comprises: at least one value of pulse width, at least one value of Pulse Repetition Interval (PRI), at least one value of initial time, and at least one value of number of pulses integrated, wherein the number of integrated pulses is at least two;
  i. perform an integration associated with the sampled received signal, based on the at least one at least one point in the parameter space, thereby deriving at least one integrated power correlating the at least one sampled received signal with the at least one point;
  j. determine a derived integrated power of the at least one integrated power which meets a signal-to-noise (SNR) condition, the derived integrated power constituting a chosen integrated power;
  k. determine a point of the at least one point in the parameter space that correlates with the chosen integrated power; and
  l. determine that parameters corresponding to the determined point constitute parameters of the at least one emitted signal, thereby detecting the at least one emitted signal.

This aspect of the presently disclosed subject matter can optionally include one or more features (i) to (xxxii) listed above, mutatis mutandis, in any desired combination or permutation which is technically possible.

In accordance with a fourth aspect of the presently disclosed subject matter, there is presented the computerized method performed by the processing circuitries of the second or third aspects of the presently disclosed subject matter.

In accordance with a fifth aspect of the presently disclosed subject matter, there is presented a non-transitory program storage device readable by a computer, tangibly embodying computer readable instructions executable by the computer to perform the computerized method performed by the processing circuitries of the second or third aspects of the presently disclosed subject matter.

The methods and the non-transitory program storage devices, disclosed herein according to various aspects, are capable of use, in some examples, in at least one of Elint and Sigint.

The methods and the non-transitory program storage devices, disclosed herein according to various aspects, can optionally further comprise one or more of features (xxiii) to (xxxii) listed above, mutatis mutandis, in any technically possible combination or permutation.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 2 illustrates schematically an antenna system, in accordance with some examples of the presently disclosed subject matter;

FIG. 6 illustrates schematically a multi-dimensional feed manifold, in accordance with some examples of the presently disclosed subject matter;

DETAILED DESCRIPTION

As used herein, the phrase "for example," "such as" and variants thereof describing exemplary implementations of the present invention are exemplary in nature and not limiting.

It is appreciated that certain features of the invention, which are, for clarity, described in the context of separate embodiments, may also be provided in combination in a single embodiment.

Figure 1:
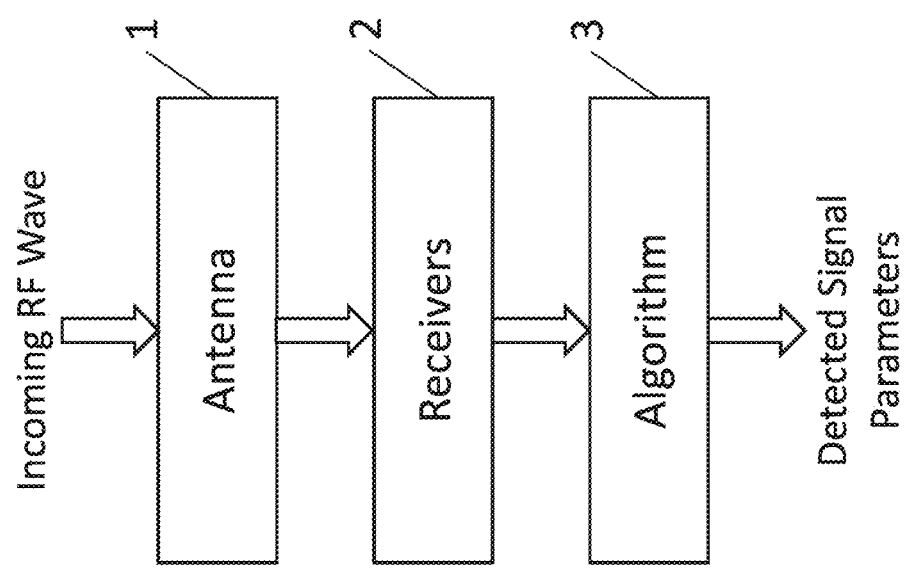
FIG. 1 illustrates schematically a signal detection system, in accordance with some examples of the presently disclosed subject matter.

Bearing the above in mind, attention is now drawn to FIG. 1, illustrating schematically a signal detection system, in accordance with some examples of the presently disclosed subject matter. This system is disclosed further herein.

In some examples, the algorithm 3 component, the receiver 2, and/or the antenna assembly 1, of the signal detection system, is associated with one or more processing circuitries. In some examples, the signal detection system comprises, or is otherwise associated with, one or more processing circuitries (not shown). In some examples, each such processing circuitry comprises a processor (not shown) and a memory (not shown). In the non-limiting example of the disclosure below, three processing circuitries, referred to herein respectively as the first, second and third processing circuitries, perform three different functions. In other examples, one or more of such processing circuitries are shared over multiple functions. For example, the first and second processing circuitries can be the same, in some cases. In some examples, the processing circuitry is located on, and/or is associated with, the antenna system 1 or the receivers 2.

In some examples, each processor comprises at least several functional modules. These modules can be implemented in one or more of hardware (analog and/or digital), software and/or firmware. These modules can perform the functionalities below disclosed with respect to the first, second and third processing circuitries, respectively.

In some examples, each memory stores information associated with calculations and other determinations performed by the relevant algorithm(s).

Attention is now drawn to FIG. 2, illustrating schematically an antenna system 1, in accordance with some examples of the presently disclosed subject matter. The antenna system is in some examples configured for use in at least one of Elint and Sigint, and is configured to detect weak electro-magnetic signals. In some examples, such an antenna system 1 comprises:

i. an antenna 11; and
ii. a feed manifold 13.

In some examples the feed manifold 13 includes a plurality of feeds located on a focal surface of the antenna. In some examples, the antenna 11 is configured to function as a two-dimensional focusing element, having spherical symmetry. In some examples, the antenna system 11 is configured such that a planar wave-front, impinging on the antenna 11 (the planar wave-front being associated with an electro-magnetic signal), is focused by the antenna 11 to a feed of the plurality of feeds. Each such feed is situated at a distance 17 from the antenna corresponding to a focal distance of the antenna 11 along a propagation vector of the planar wave-front.

The antenna 11 thereby produces, for each feed of the plurality of feeds, a respective high-gain beam. That is, there are produced a plurality of high-gain beams, where each respective high-gain beam of the plurality of high-gain beams is associated with each feed of the plurality of feeds. The direction of the respective high-gain beam is along the line connecting the center of the spherical symmetry and each feed. In some examples, the plurality of respective high-gain beams is referred to herein also as sampled received signal, in some cases after being processed by front end 18 and being output as output signal 10 to algorithm 3.

In some examples, antenna 11 is configured to produce multiple concurrent high-gain beams covering a wide spatial field of view.

In some examples, all of the beams to the feeds have the same gain. In some examples, the tolerance on the spherical symmetry is per antenna system requirements, and can be based also on lens size. A 10% tolerance may in some examples decrease gain by approximately 1 dB. In some examples, a hemispherical lens can be used, reducing the gain of side beams in some examples by approximately 3 dB.

In some examples, in order to prevent gaps between adjacent beams in the field of view, the spacing between the feeds is equal to or less than half of a wavelength of the electro-magnetic signal(s).

Note that in some examples, the antenna 11 combines the functions of an antenna and also those of a beam-forming network, which must be used in some other art.

In some examples the spatial field of view of the antenna system 1 is based on a number of the plurality of feeds and the spacing between feeds of the plurality of feeds. In some examples, this is a 90 degree field of view. In some examples is this a 120 degree field of view. Note that in the case of 120 degree field of view, there may be some degradation of the gain.

In some non-limiting examples, the antenna 11 is one of a lens antenna and a shaped reflector. In some examples, the lens antenna is spherical. In some examples, the lens antenna is a spherical constant-K dielectric antenna. In some examples, the lens antenna is a Luneburg lens antenna. In some other examples, the lens antenna is a hemispherical antenna. In some examples, the shaped reflector is a circular reflector.

In some examples, the feed manifold 13 is a sectoral feed manifold, e.g. as depicted in FIG. 2. In some examples, the spacing between the feeds is equal to or less than half of a wavelength of the at least one electro-magnetic signal. In some examples, the distance from the antenna 17 differs from the focal distance, thereby decreasing a focus of the feed, thereby widening a received beam width of the respective high-gain beam, thereby reducing a sensitivity of the cross-over loss of the respective high-gain beam to the spacing between feeds.

In some examples, each feed comprises a waveguide horn 16, serving as an aperture waveguide. In some examples, the waveguide horn 16 is a horizontally-polarized waveguide horn. The implementation disclosed with reference to FIGS. 3, for example, uses such a horizontally-polarized waveguide horn. In some examples, the antenna system 1 includes a sectoral polarizer 14. In some examples, the antenna system 1 includes a sectoral radome 15. In some examples, the antenna system 11 includes a front-end circuit 18.

Additional disclosure concerning antenna system 11 of FIG. 2 is provided further herein.

In some examples, an antenna such as 11 may be referred to herein as a shared aperture multiple-beam high-gain antenna. Note that in some examples antenna 11 serves as a shared aperture for the multiple high-gain beams.

Figure 8:
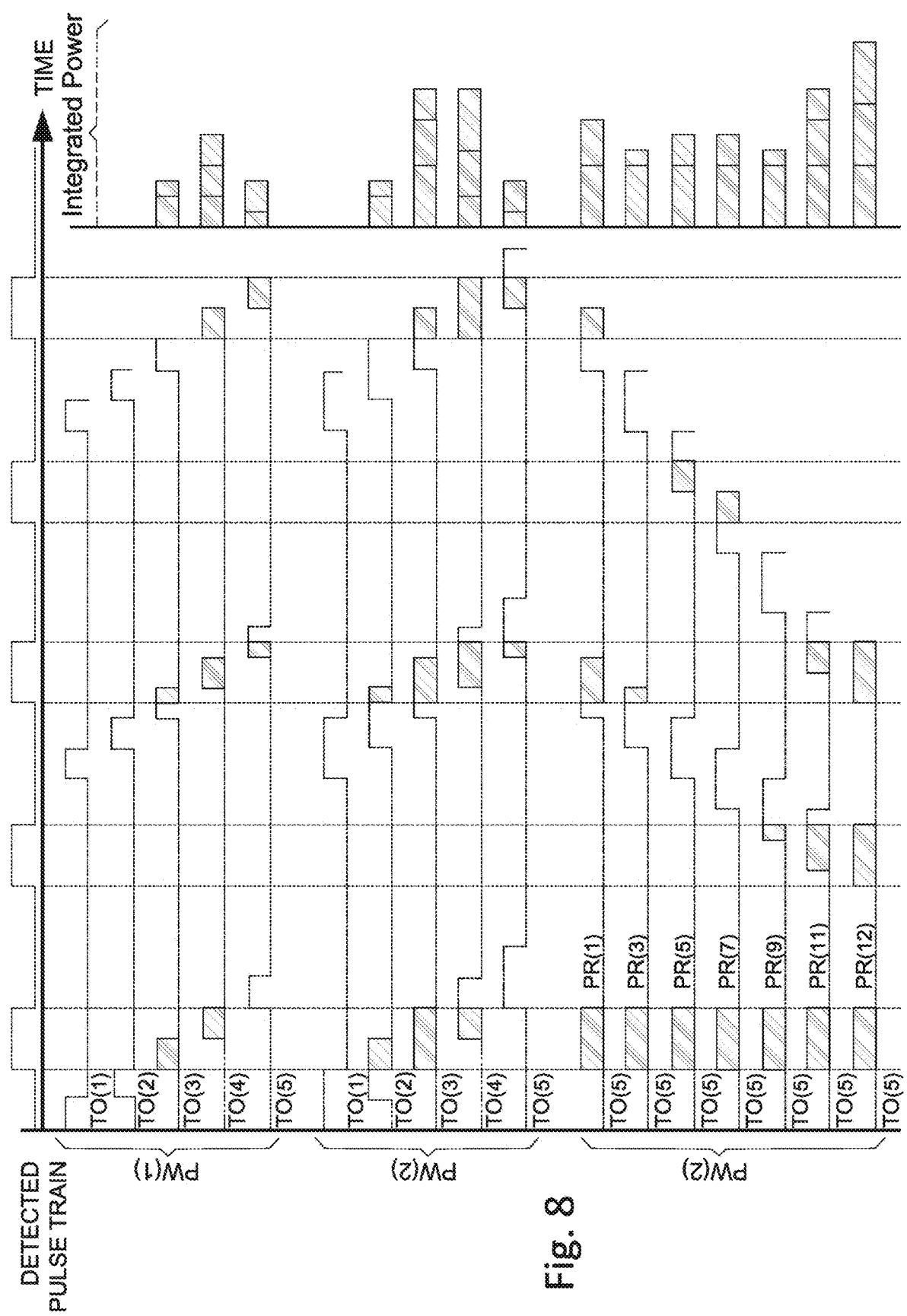
FIG. 8 illustrates schematically an example algorithm for signal detection, in accordance with some examples of the presently disclosed subject matter.

Note that, in some examples, the system of FIG. 2, and/or the algorithm exemplified by FIG. 8, may enable detection of weak signals—in some cases even of extremely weak pulsed or modulated signals—even in cases where the position and/or the frequency of the signals is unknown.

Figure 3A:
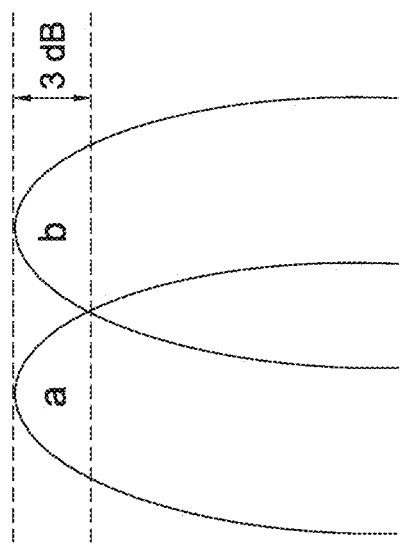
FIGS. 3A, 3B, 3C illustrate schematically intermediate beams, in accordance with some examples of the presently disclosed subject matter.
Figure 3B:
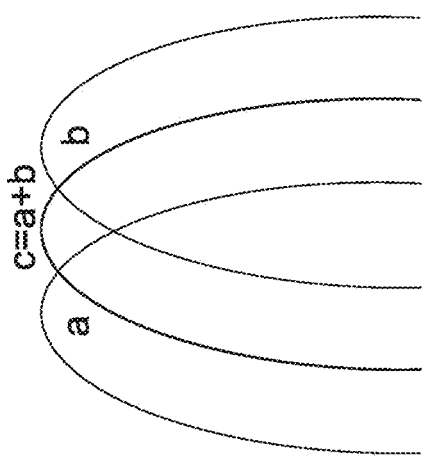
Figure 3C:
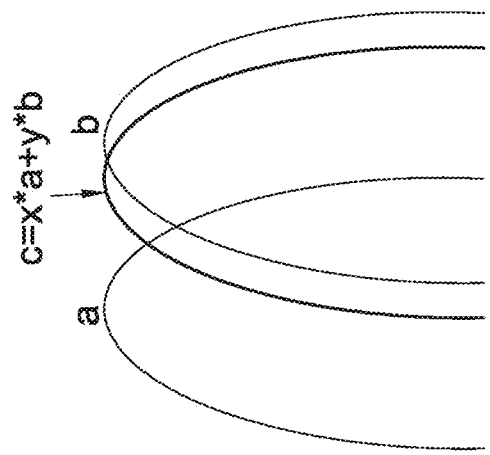

Attention is now drawn to FIGS. 3A, 3B, 3C, illustrating schematically intermediate beams, in accordance with some examples of the presently disclosed subject matter. In some examples, the antenna system 11, or the signal detection system, further comprises a first processing circuitry, configured to perform weighted summing of adjacent respective high-gain beams. In some examples, this enables production of intermediate virtual high gain beams. In some examples, the process disclosed with reference to FIG. 3 is performed on the output 10. Further description of these figures is provided further herein.

Figure 4:
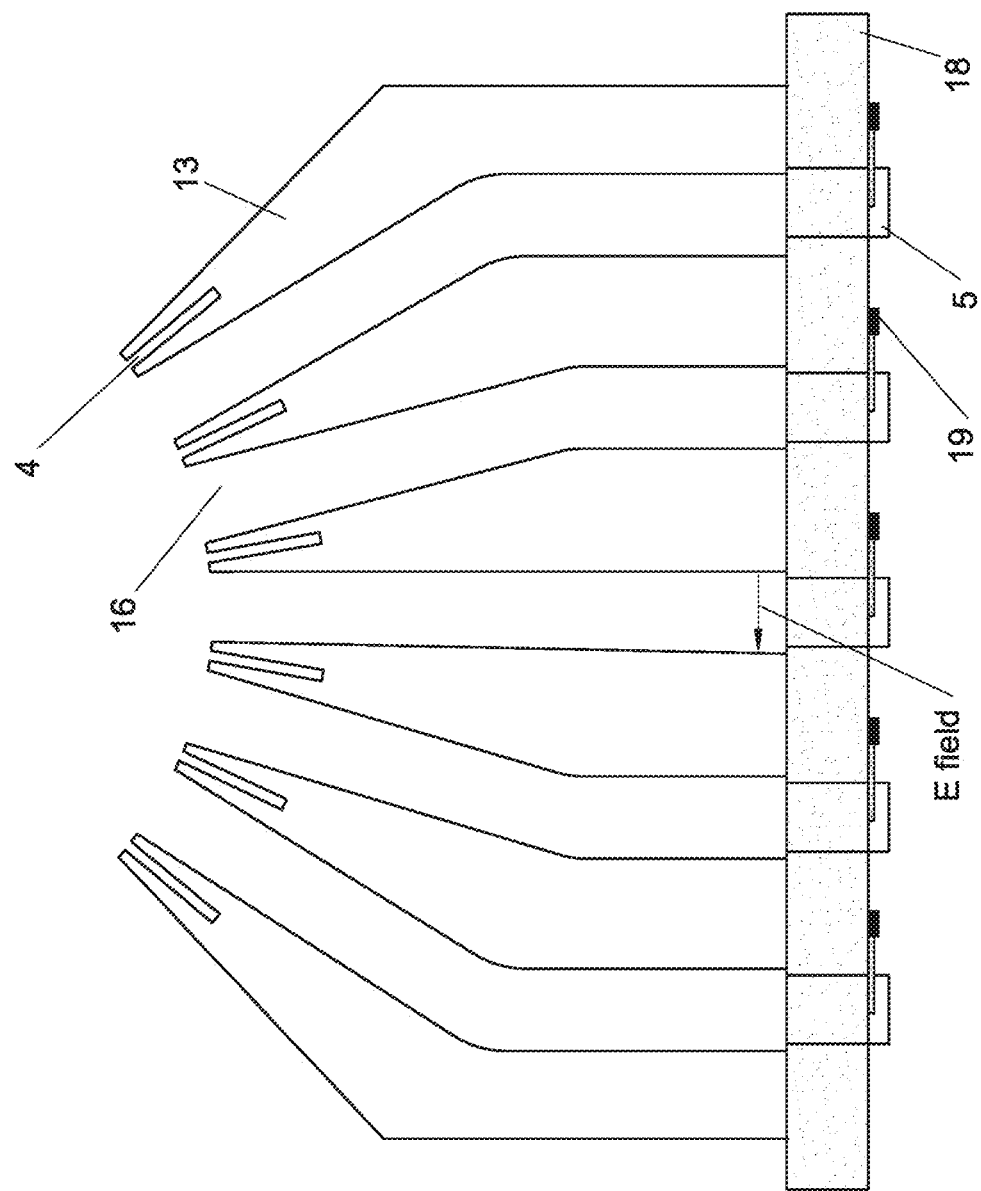
FIG. 4 illustrates schematically a Radio Frequency (RF) choke, in accordance with some examples of the presently disclosed subject matter.

Attention is now drawn to FIG. 4, illustrating schematically a Radio Frequency (RF) choke, in accordance with some examples of the presently disclosed subject matter. In some examples, each feed comprises an RF choke, thereby enabling reduction of electro-magnetic coupling between adjacent feeds. Additional description of this figure is provided further herein.

Figure 5:
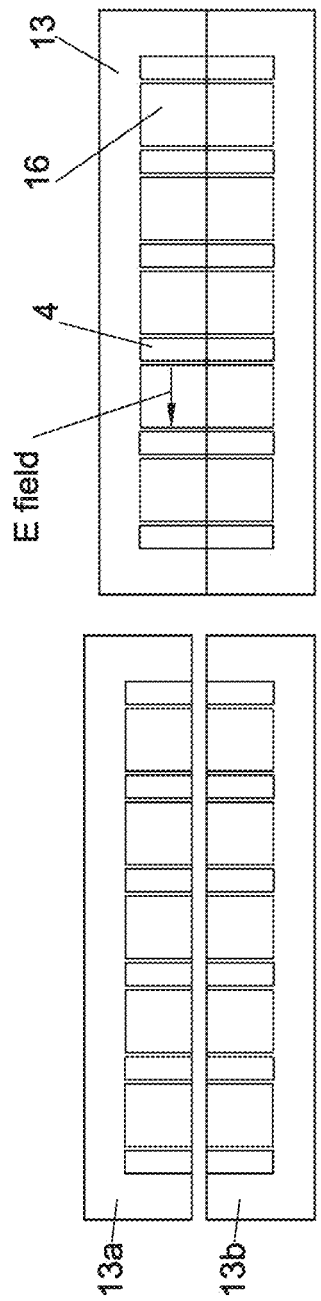
FIG. 5 illustrates schematically a feeds manifold, in accordance with some examples of the presently disclosed subject matter.

Attention is now drawn to FIG. 5, illustrating schematically a feeds manifold, in accordance with some examples of the presently disclosed subject matter. In some examples, the feed manifold comprises two opposite halves. Note that in some examples such a feeds manifold is relatively less expensive to manufacture, as there is no electrical continuity requirement between the two parts. Additional description of this figure is provided further herein.

Attention is now drawn to FIG. 6, illustrating schematically a multi-dimensional feed manifold, in accordance with some examples of the presently disclosed subject matter. Additional description of this figure is provided further herein. Note that the two FIG. 6 show views that are 90 degrees off from each other.

Figure 7:
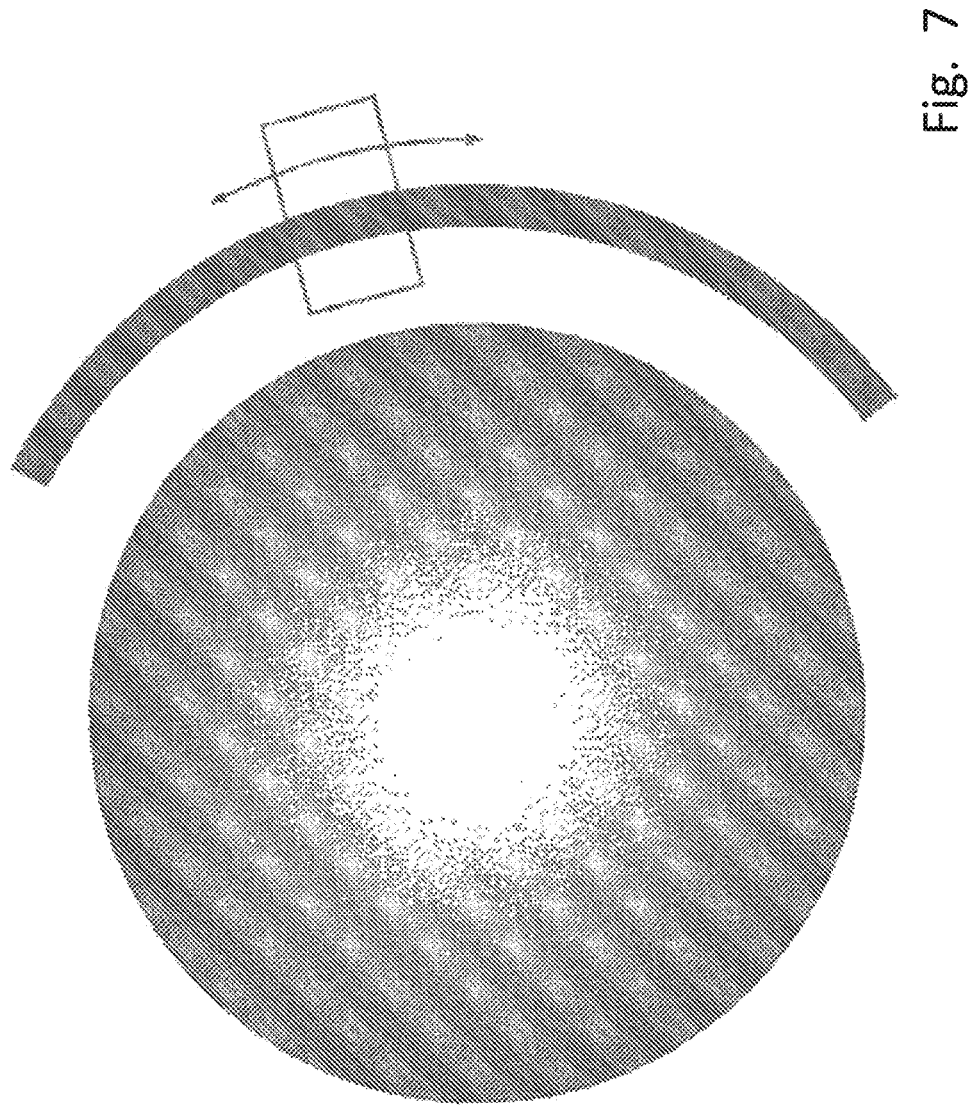
FIG. 7 illustrates schematically a feed manifold configured for mechanical rotation, in accordance with some examples of the presently disclosed subject matter.

Attention is now drawn to FIG. 7, illustrating schematically a feed manifold configured for mechanical rotation, in accordance with some examples of the presently disclosed subject matter. In some examples, the feed manifold is configured for mechanical rotation, thereby enabling change of the center of the spatial field of view. Additional description of this figure is provided further herein.

In some examples, the antenna system 11, or the signal detection system, includes a second processing circuitry. In some examples the second processing circuitry is configured to perform direction finding of the at least one electro-magnetic signal by amplitude comparison of adjacent high-gain beams. Additional description of this functionality is provided further herein.

Attention is now drawn to FIG. 8, illustrating an example algorithm for signal detection, in accordance with some examples of the presently disclosed subject matter. In some examples, a system for processing of electro-magnetic signals, such as the signal detection system of FIG. 1, includes a third processing circuitry. In some examples, the third processing circuitry is configured to perform a computerized method, which can include at least the following steps:

a. receive at least one sampled received signal 10, comprising at least one emitted signal emitted by a transmitter (not shown in the figures);

b. determine at least one point in a parameter space. The at least one point in the parameter space comprises: at least one value of pulse width, at least one value of Pulse Repetition Interval (PRI), at least one value of initial time, and at least one value of number of pulses integrated, (note: the number of integrated pulses is at least two);

c. perform an integration associated with the sampled received signal, based on the at least one at least one point in the parameter space, thereby deriving at least one integrated power correlating the at least one sampled received signal with the at least one point;

d. determine a derived integrated power of the at least one integrated power which meets a signal-to-noise (SNR) condition. The derived integrated power may be referred to herein also as a chosen integrated power;

e. determine a point of the at least one point in the parameter space that correlates with the chosen integrated power; and f. determine that parameters corresponding to the determined point constitute parameters of the at least one emitted signal, thereby detecting the at least one emitted signal.

In some examples, the SNR condition comprises a SNR of the chosen integrated power being above a required SNR. Integration may stop then, and the signal is detected, although the values of signal parameters may not be certain.

In some other examples, chosen integrated power is a maximum derived integrated power, corresponding to a maximum SNR. In some examples, the parameters associated with the maximum derived integrated power are those of the emitted signal. Additional description of these functionalities, and of FIG. 8, is provided further herein.

In some examples, step (c) above is not performed for all values M of number of pulses to integrate. Instead, step (c) is performed for first increasing values of number of pulses, e.g. M=1, M=2 etc., until the derived integrated power meets a first SNR threshold condition. At that point, no further integrations are performed. Such a non-comprehensive search of the parameter space may result in sufficient SNR of the signal to enable detection. However, the parameters derived may in some cases not be accurate, as insufficient integrations were performed within the entire parameter space to provide convergence to the correct solution for the parameters.

In some other examples, step (c) is performed in more than one stage. For example, step (c) is first performed for first increasing values of number of pulses, e.g. M=1, M=2 etc., until the derived integrated power meets a first SNR threshold condition. Then a second stage of integration is performed. Step (c) is now performed for second increasing higher values of the number pulses, e.g. M=3, 4, etc. Note that the second increasing higher values are larger than the first increasing higher values. However, for this second stage, integration is not performed for the entire parameter space. Instead, the second stage integrations are performed for a first modified (reduced) parameter space, comprising a subset of at the least one value of pulse width (PW), the at least one value of PRI, and the at least one value of initial time. This reduced parameter space is based on the performance of step (c) for the first increasing higher values, which may narrow the range of expected values of PW, PRI and initial time of the emitted signal, and provide quicker convergence to the solution.

In some examples, the least one emitted signal comprises a modulated signal.

In some examples, the integration comprises summation of energy of the at least one the sampled received signal. In some examples, this is done in a case where the least one emitted signal comprises a non-coherent signal.

In some examples, the least one emitted signal comprises a coherent signal. In such a case, it may be that the integration compromises signal voltage integration of the sampled received signal, thereby enabling an improvement in SNR of the detected emitted, as compared to a non-coherent integration (i.e. based on summation of energy).

In some examples, when performing summation of energy, the maximum improvement of SNR is proportional to the square root of the number (M) of pulses integrated. By contrast, in some examples of coherent integration—SNR improvement is proportional to M, the number of integrated pulses. For example, if M=100, non-coherent integration can in some cases improve SNR by a factor of ten (10), while coherent integration could in such a case possibly improve SNR by a factor of 100. However, coherent integration requires higher calculation complexity, due to integration with a smaller time-step granularity.

As one example method of dealing with the higher calculation complexity, a multiple stage algorithm can be used, in some cases. For a coherent emitted signal to be detected, in step (c) the processing circuitry can first perform non-coherent integration, which is less intensive in computation. When a sufficiently high SNR has been obtained, that is the derived integrated power meets a second SNR threshold condition, the parameter space can be decreased, as the range of possible values of PRI, PW and initial time may be reduced. This is referred to herein also as a second modified parameter space. This second modified parameter space includes a subset of at the least one value of pulse width, the at least one value of PRI, and the at least one value of initial time. This second modified parameter space is based on the non-coherent integration.

Step (c) can then perform a coherent integration, based on the smaller parameter space. By zooming onto a smaller parameter space, the coherent integration can be performed in a relatively, more efficient manner, with quicker convergence to the solution.

In some examples, the algorithm of FIG. 8 or the antenna system 1 may function alone. For example, where there is insufficient processing power to run the algorithm of FIG. 8, the antenna system 1 itself may be useful in enabling detection of signals. Similarly, in some examples, when there is no antenna system 1, the algorithm of FIG. 8 itself may be useful in enabling detection of signals.

Note that the system of FIG. 2 can in some examples be combined with the algorithm of FIG. 8, so that both functions are performed. For example, for very weak signals, the antenna system 1 can be used to increase the gain, while the algorithm of FIG. 8 can be used to further increase gain and assist in detection. More on this is disclosed further herein.

Similarly, if antenna system 1 gives sufficient improvement in SNR, this can result in a smaller range of possible signal parameters. This smaller parameter space can make the algorithm of FIG. 8 more efficient, thus providing quicker convergence to the solution.

Also, in some examples the signal detection system can share with other detectors/sensors the information it has learned about the range of possible signal parameters of the emitted signal. This in some examples can enable the other detectors/sensors to work more efficiently, as well.

Note that the functions of the algorithm of FIG. 8, and of the antenna system 1, may reside on the same or on different platforms.

FIGS. 1-8 illustrate a schematic of the system architecture, and/or of process flow, in accordance with example embodiments of the invention. The relevant elements in FIGS. 1-8 can be made up of any combination of software and hardware and/or firmware that performs the functions as defined and explained herein. According to other examples of the presently disclosed subject matter, the system may comprise fewer, more and or different elements than those shown in FIGS. 1-8. Similarly, some steps of processes may in some examples be performed in an order other than that disclosed, and/or substantially simultaneously.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention. The operations in accordance with the teachings herein may be performed by a computer specially constructed for the desired purposes or by a general-purpose computer specially configured for the desired purpose by a computer program stored in a non-transitory computer-readable storage medium.

The terms "non-transitory memory" and "non-transitory storage medium" used herein should be expansively construed to cover any volatile or non-volatile computer memory suitable to the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as basis for designing other structures, methods, and systems for carrying out the several purposes of the presently disclosed subject matter.

Apparatus and Method for Detection of Extremely Weak Pulsed or Modulated Signals of Unknown Position and Frequency An apparatus and method for detection of weak electromagnetic sources is presented.

The position of the sources is unknown, so are the exact frequency and modulation parameters, either being pulsed or utilizing another class of modulation.

The invention is based on the combination of a novel small, shared-aperture, multibeam, high efficiency antenna, and a novel parameter correlating method of detection. This unique combination results in high probability of detection of the faintest electromagnetic sources within a wide angular sector instantaneously.

The art of detection of electromagnetic radiators and other signal sources with unknown location, frequency and modulation parameters is well established in the Sigint field. The minimum detectible signal is determined by the antenna effective area, the added noise of the receiver, and the effective noise bandwidth of the detector. In modern Sigint scenarios, some radiators are characterized by such low levels that the signal, received by even the most sophisticated equipment, is below the effective noise floor, thus they are rendered as undetectable signals. In order to capture such faint signals, effort is done to increase the amount of energy captured by increasing the area of the antenna. Nevertheless, high-gain antenna means that the beamwidth becomes so small that the spatial coverage of the antenna covers only a slight portion of the spatial area of possible sources. Since the radiators and their associated signals tend to be randomly active for short periods of time, the probability-of-intercept (POI) becomes too small to be of any practical use. Even if the antenna rotates to scan the required field-of-view (FOV), the POI remains tiny. This limitation may be resolved by increasing the number of simultaneous antennas and receivers at a cost of enlarging the occupied area of the Sigint system or other system, and multiplying the hardware proportionally. In order to alleviate the first problem, multibeam antennas of shared-aperture are utilized. Most modern designs of such antennas employ a wideband planar antenna array, with either digital or analog beamforming. There are several drawbacks of such designs. First, there is a scan loss of side looking beams, leading to increased antenna area (by a factor of two (2) and more), and increased number of receivers by the same factor. Second, the complexity of digital or analog beamforming networks is relatively large. Therefore, a need for multibeam antenna, with no scan loss and no beamforming network is sought after.

This patent application suggests such a solution, dealing also with the loss encountered by cross-over levels between adjacent beams. Such an antenna has been built with twenty-five (25) beams covering a field of view of 90 degrees with more than 30 dBi gain. This is an extremely large improvement regarding a typical gain of −3 dBi to +5 dBi in wide-angle designs which are common in the Sigint field, and a very large improvement regarding a typical gain of 10 dBi to 20 dBi (over the entire spatial coverage) in multibeam antenna array designs. Yet, in many cases it is not sufficient to treat only the antenna, as the installation size limitations, and the practical number of simultaneous receivers, dictate an antenna which is still too small for detection. In this patent application a novel type of parameter correlating algorithm is introduced, which has already proved to increase the signal-to-noise-ratio (SNR) by an order of 10 to 100. Therefore, this invention has a potential for improvement of 20 dB to 40 dB in the system sensitivity over the known art, still keeping a minimal occupied volume of the system with a minimal number of channels and 100% POI in spatial coverage.

A signal detection system is composed of three (3) main blocks, as depicted in FIG. 1: Antenna (1), Receivers (2) and a parameter correlating algorithm (3).

The Antenna

FIG. 2 depicts a detailed construction of the antenna. The antenna (1) is composed of preferably a single dielectric spherical lens (11) with integrated mechanical interface (12), a sectorial feed manifold (13), preferably horizontally-polarized waveguide horn (16), an optional sectorial polarizer (14) and an optional sectorial radome (15). The feed is situated at a certain distance (17) from the lens, providing required features of the beam shape.

The feed manifold is preferably attached directly to a front-end (FE) circuit 18. This FE is constructed with FE regulating elements 19 as known in the art (i.e. amplifiers, limiters, filters, frequency translators etc.).

A constant-K dielectric lens antenna is known in the literature as a simplest approximation to the Luneburg-Lens antenna, comprised of a dielectric sphere and an air shell layer. Such lenses are limited to moderate gain of up to 30-32 dBi due to the increased phase-error loss as the diameter of the lens increases. The beam shape shall be approximately symmetric in cardinal planes, assuming that the feed has a symmetric pattern. The feed illuminates the lens with a spherical wavefront, and the lens converts it to a planar wavefront which generates a high gain beam towards the opposite direction of the feed. Displacing the feed around the sphere moves the beam direction in accordance without any scan loss due to the spherical symmetry of the antenna.

The feed employed in the context of the patent is a horizontally-polarized, reduced-height waveguide, possibly flared in H-plane (16). A multitude of such feeds is arranged in a sector around the lens, generating a multibeam antenna as depicted in FIG. 4. This special arrangement facilitates that the phase centers of the horns shall be close enough to each other leading to acceptable beam overlapping of approximately −3 dB cross-over loss between adjacent beams (FIG. 3a). This loss is gained back in the proposed system by a novel weighting between adjacent beams, done either in a digital or analog manner. Simply, a phase compensated addition of adjacent beams renders a third beam midway between the first pair of beams (FIG. 3b). This beam shall add noise non-coherently between two receiver channels, while adding signals coherently. Therefore, at the cross-over point, an S/N gain of 3 dB is attained relative to a single beam. Therefore, the S/N at the peak of the 3'rd beam is approximately the same as attained at the peak of each of the first 2 beams. If required, other intermediate beams may be generated without a need for additional antenna ports or receivers. These intermediate beams are squinted between the two generating beams by employing amplitude weighing (FIG. 3c). This method exploits the antenna aperture to its fullest potential gain.

The coupling between adjacent feeds may reduce the antenna gain. Therefore, an RF current barrier is carved in between the feeds. This barrier acts as an RF choke, transforming a back-short circuit into an open circuit in the feed aperture through a quarter wavelength section (4).

The feed may be flared in H-plane to adjust the elevation beamwidth as required by the application. The wider the flare, the wider is the elevation beamwidth.

As depicted in FIG. 5, the feeds manifold is preferably constructed of two similar parts, dividing the waveguides on their symmetry line where no lateral currents exist, thus alleviating the electrical continuity requirement between the two parts.

The waveguide manifold is shaped such that all waveguide ports end at the same plane. This method facilitates direct parallel interface to a PCB (18), on which all the RF front-end circuits of the receiver channels reside. Usually, a waveguide to microstrip launcher is printed as part of the PCB for each channel, as known in the art.

Direction Finding (DF) of the received signal is carried out by amplitude comparison DF. This method is well known in the art. The similarity between beams, due to the spherical symmetry, enhances the DF performance relative to multibeam array antennas. This enhancement stems from the inevitable beam broadening and asymmetry of scanned beams in planar arrays, while in the proposed invention the beamwidth remains constant and symmetrical.

A second row of feeds may be added in the elevation plane above the first row, producing a beam manifold which points downwards, as depicted in FIG. 6. This may be repeated upwards or downwards as necessary to cover the required elevation operation of the system. These additional beams may be employed to measure the elevation DF of the received signal.

In another embodiment, the feed-manifold may be rotated mechanically in elevation to cover a required strip of elevation (FIG. 7). In contrast to other types of antennas, this embodiment facilitates the rotation of the relatively small feed manifold while the large lens keeps static.

In cases where the required polarization differs from the horizontal polarization of the feeds, an additional polarization rotation circuit (14) may be inserted between the feed manifold and the lens (FIG. 2). Since the polarizer acts locally on the feed itself, the polarizer circuit is much smaller than a full aperture one, and it exhibits much better symmetry for all scanning beams. Note that the spherical lens is oblivious to polarization. Additionally, a protective radome (15) may be placed only on the feed apertures, while the large lens may be exposed to the environment, provided that the material is appropriate.

A Correlating Algorithm

The common practice in detection of non-cooperative (unknown) signals is based on single-pulse threshold detection. Therefore, the resultant bandwidth of the detection is adapted to match the expected pulse bandwidth (either ~1/pulse-width or chirp-width). Adaptive sliding integration reaches near optimal performance aimed at single pulse detection. However, when the signal is too weak to be detected, an innovative pulse-train integration algorithm is proposed. The algorithm may work fast with slim resource requirements when the correlation is done non-coherently on energy accumulation method, or may employ extensive coherent correlation windows, resulting in higher signal improvement.

The non-coherent algorithm (FIG. 8):

The basic principle is to open a time window only when the pulses exist, thus noise between pulses will not be integrated, and the noise bandwidth for each pulse shall be minimal, according to the pulse-width. Power measurement is performed on each receive window, thus integration is done incoherently by summation of energies from all receive windows.

Since neither the timing of the first pulse, nor the pulse-width or the PRI are known, a multi-dimensional search algorithm is employed over the data maximizing the energy.

A basic search algorithm follows. However, more sophisticated search algorithms may aim at the following targets:
a. Accelerating convergence using genetic methods or gradient methods.
b. Handling non-stable PRI streams using genetic methods or gradient methods.
c. Handling frequency hopping/chirping by extending search space to multi-frequency bin space either extensively (for quasi-random hopping) or along consecutive bins (for chirps).
d. Handling phase modulations within pulse. Power integration followed by detection of phase discontinuity may be employed to improve S/N.

Note that if detection is available on a single pulse, a fast algorithm may be employed to integrate the pulse train to improve S/N. In such a case, the single-pulse detection threshold may be lowered, such that the probability of detection is improved, while false-alarm events increase. The false alarms shall be sifted out by the integration algorithm.

1. Set pulse width to PW(i) {PW(1) is the shortest expected pulse-width, and PW(N) is the largest expected pulse-width. dPW is the resolution between consecutive pulse widths over the search space, which should usually be smaller than 25% of PW(i) in order to avoid loss greater than 1 dB while minimizing computation complexity}
2. Set PRI(j); {PRIM is the lowest PRI, and PRI(N) is the largest expected PRI. dPRI is the resolution of the search in the PRI sub-space. Usually, dPRI=dPW}.
3. SetT(O) between 0 and PRI(i).
4. Open M windows to capture M pulses. Begin with low values of M and increase this number until detection. Once acceptable detection is achieved, the approximate parameters of the pulse train are already available, and may be used as a starting point to integrate more pulses.
5. For any value of M (number of pulses to integrate), search for maximum S/N over the parameter space (changing PRI and PW).

An example is depicted in FIG. 8.

Coherent Integration

The same procedures operated on IF samples with additional degree of freedom of phase modulation (not necessary if pulse train source is coherent along dwell and is stable regarding phase or frequency-unmodulated pulse). Chirped or modulated pulses might first be captured using non-coherent integration, then S/N shall be improved using coherent integration with phase/frequency space search.

The invention claimed is:

1. An antenna system, configured to detect electro-magnetic signals, comprising:
   a. an antenna; and
   b. a sectoral feed manifold, the sectoral feed manifold comprising a plurality of feeds located on a focal surface of the antenna,
   wherein the antenna is configured to function as a two-dimensional focusing element, having spherical symmetry,
   wherein the antenna system configured such that a planar wave-front impinging on the antenna, the planar wave-front associated with at least one electro-magnetic signal, is focused by the antenna to a feed of the plurality of feeds, the feed situated at a distance from the antenna corresponding to a focal distance of the antenna along a propagation vector of the planar wave-front,
   wherein the spatial field of view of the antenna system is based on a number of the plurality of feeds and the spacing between feeds of the plurality of feeds, wherein the spacing between the feeds is equal to or less than half of a wavelength of the at least one electro-magnetic signal,
   the antenna thereby producing, for each feed of the plurality of feeds, a respective high-gain beam, wherein the direction of the respective high-gain beam is along the line connecting a center of the spherical symmetry and the each feed,
   wherein the sectoral feed manifold comprises two opposite halves,
   wherein the two opposite halves are divided along a symmetry line along the E-field,
   wherein the each feed comprises an RF choke, thereby enabling reduction of electro-magnetic coupling between adjacent feeds, wherein the RF choke comprises an RF current barrier, which is carved into the sectoral feed manifold in between at least some adjacent feeds,
wherein the system comprises a sectoral polarizer inserted between the sectoral feed manifold and the lens.

2. The antenna system of claim 1, wherein the antenna is one of a lens antenna and a shaped reflector.

3. The antenna system of claim 2, wherein at least one of the following is true:
   a. the lens antenna is spherical;
   b. the lens antenna is a spherical constant-K dielectric antenna;
   c. the lens antenna is a Luneburg lens antenna;
   d. the lens antenna is a hemispherical antenna; and
   e. the shaped reflector is a circular reflector.

4. The antenna system of claim 1, wherein the distance from the antenna differs from the focal distance, thereby decreasing a focus of the feed, thereby widening a received beam width of the respective high-gain beam, thereby reducing a sensitivity of a cross-over loss of the respective high-gain beam to the spacing between feeds.

5. The antenna system of claim 1, wherein the sectoral feed manifold is a multi-dimensional sectoral feed manifold,
   wherein the multi-dimensional feed manifold comprises multiple sectoral feed manifolds,
   wherein first feeds of a first sectoral feed manifold, of the multiple sectoral feed manifolds, are arranged in a first plane pointing in a first direction,
   wherein second feeds of a second sectoral feed manifold are arranged in a second plane pointing in a second direction, which is distinct from the first direction,
   wherein the number of sectoral feed manifolds is based on a required elevation operation of the antenna.

6. The antenna system of claim 1, wherein the sectoral feed manifold is configured for mechanical rotation, thereby enabling change of a center of the spatial field of view.

7. The antenna system of claim 1, wherein the each feed comprises a waveguide horn.

8. The antenna system of claim 7, wherein the waveguide horn is a horizontally-polarized waveguide horn.

9. The antenna system of claim 1, wherein the system comprises a front-end circuit.

10. The antenna system of claim 1, wherein the antenna system further comprises a first processing circuitry, the first processing circuitry configured to perform weighted summing of adjacent respective high-gain beams, thereby enabling production of intermediate virtual high gain beams.

11. The antenna system of claim 1, wherein the antenna system comprises a second processing circuitry, the second processing circuitry configured to perform direction finding of the at least one electro-magnetic signal by amplitude comparison of adjacent high-gain beams.

12. The antenna system of claim 1, wherein the antenna is a wideband antenna.

13. A system for processing of electro-magnetic signals, comprising a third processing circuitry, the third processing circuitry configured to perform a computerized method, the computerized method comprising the following:
   i. receive at least one sampled received signal, comprising at least one emitted signal emitted by a transmitter;
   ii. determine a plurality of points in a parameter space, wherein each point in the parameter space of the plurality of points comprises: a value of pulse width, a value of Pulse Repetition Interval (PRI), a value of initial time, and a value of number of integrated pulses, wherein the number of integrated pulses is at least two, wherein the plurality of points in the parameter space are non-identical;
   iii. repeatedly performing the following, wherein each repetition is performed in respect of a unique point of the plurality of points:
      perform an integration associated with the at least one sampled received signal, based on the unique point, thereby deriving at least one corresponding integrated power correlating the at least one sampled received signal with the unique point,
   the repetition thereby deriving a plurality of corresponding integrated powers,
   the repetition constituting a search in the parameter space;
   iv. determine a derived integrated power, of the plurality of corresponding integrated powers, which meets a signal-to-noise (SNR) condition, the derived integrated power constituting a chosen integrated power;
   v. determine a determined point in the parameter space, of the plurality of points in the parameter space that correlates with the chosen integrated power; and
   vi. determine that parameter values corresponding to the determined point constitute parameters of the at least one emitted signal, wherein the parameters comprise one or more of a determined pulse width, a determined Pulse Repetition Interval (PRI), and determined initial time,
   thereby detecting the at least one emitted signal.

14. The system of claim 13, wherein said step (iii) is performed for first increasing higher values of the number of integrated pulses (M), until the derived integrated power meets a first SNR threshold condition.

15. The system of claim 14, the method further comprising performing said step (iii) for second increasing higher values of the number of integrated pulses (M), for a first modified parameter space comprising a subset of values of pulse width, values of PRI, and values of initial time,
   wherein the first modified parameter space is based on the performance of said step (iii) for the first increasing higher values,
   wherein the second increasing higher values are larger than the first increasing higher values.

16. The system of claim 13, wherein the integration comprises summation of energy of the at least one sampled received signal.

17. The system of claim 13, wherein the least one emitted signal comprises at least one of:
   a. a coherent signal, wherein the integration compromises signal voltage integration of the at least one sampled received signal, wherein the signal voltage integration thereby enables an improvement in SNR of the detected emitted, as compared to a non-coherent integration;
   b. a non-coherent signal;
   c. a modulated signal.

18. The system of claim 13, wherein said step (iii) is performed utilizing a non-coherent integration, until the derived integrated power meets a second SNR threshold condition,
   the method further comprising performing said step (iii) utilizing a coherent integration for a second modified parameter space comprising a subset of values of pulse width, values of PRI, and the values of initial time,
   wherein the second modified parameter space is based on the non-coherent integration.

19. An antenna system, configured to detect electro-magnetic signals, comprising:
   a. an antenna;

b. a sectoral feed manifold, the sectoral feed manifold comprising a plurality of feeds located on a focal surface of the antenna; and c. a third processing circuitry, the third processing circuitry configured to perform a computerized method, wherein the antenna is configured to function as a two-dimensional focusing element, having spherical symmetry, wherein the antenna system is configured such that a planar wave-front impinging on the antenna, the planar wave-front associated with at least one electro-magnetic signal, is focused by the antenna to a feed of the plurality of feeds, the feed situated at a distance from the antenna corresponding to a focal distance of the antenna along a propagation vector of the planar wave-front, wherein the spatial field of view of the antenna system is based on a number of the plurality of feeds and the spacing between feeds of the plurality of feeds, wherein the spacing between the feeds is equal to or less than half of a wavelength of the at least one electro-magnetic signal, the antenna thereby producing a plurality of high-gain beams, each respective high-gain beam of the plurality of high-gain beams associated with each feed of the plurality of feeds, wherein the direction of the each respective high-gain beam is along the line connecting a center of the spherical symmetry and the each feed, wherein the sectoral feed manifold comprises two opposite halves, wherein the two opposite halves are divided along a symmetry line along the E-field, wherein the each feed comprises an RF choke, thereby enabling reduction of electro-magnetic coupling between adjacent feeds, wherein the RF choke comprises an RF current barrier, which is carved into the sectoral feed manifold in between at least some adjacent feeds, wherein the system comprises a sectoral polarizer inserted between the sectoral feed manifold and the lens, wherein a plurality of the respective high-gain beams constituting at least one sampled received signal, wherein the computerized method comprises the following:

i. receive the at least one sampled received signal, comprising at least one emitted signal emitted by a transmitter;

ii. determine a plurality of points in a parameter space, wherein each point in the parameter space of the plurality of points comprises: a value of pulse width, a value of Pulse Repetition Interval (PRI), a value of initial time, and a value of number of integrated pulses, wherein the number of integrated pulses is at least two, wherein the plurality of points in the parameter space are non-identical;

iii repeatedly performing the following, wherein each repetition is performed in respect of a unique point of the plurality of points:

perform an integration associated with the at least one sampled received signal, based on the unique point, thereby deriving at least one corresponding integrated power correlating the at least one sampled received signal with the at least one unique point, the repetition thereby deriving a plurality of corresponding integrated powers, the repetition constituting a search in the parameter space;

iv. determine a derived integrated power, of the plurality of corresponding integrated powers which meets a signal-to-noise (SNR) condition, the derived integrated power constituting a chosen integrated power;

v. determine a determined point in the parameter space, of the plurality of points in the parameter space that correlates with the chosen integrated power; and vi. determine that parameter values corresponding to the determined point constitute parameters of the at least one emitted signal, thereby detecting the at least one emitted signal.

20. The system of claim 1, wherein the spatial field of view comprises a 90-degree field of view.

21. The antenna system of claim 1, wherein the antenna system is configured to generate up to twenty-five (25) beams.

22. The antenna system of claim 1, wherein the antenna system is configured to provide more than 30 dBi gain.

23. The system of claim 1, wherein the RF current barrier comprises a quarter wavelength section.

* * * * *